US009506395B2

(12) United States Patent
Isermeyer et al.

(10) Patent No.: US 9,506,395 B2
(45) Date of Patent: Nov. 29, 2016

(54) COOLING SYSTEM AND ASSOCIATED OPERATING METHOD

(71) Applicant: Mahle International GmbH, Stuttgart (DE)

(72) Inventors: Tobias Isermeyer, Lowenstein (DE); Peter Wieske, Korntal-Muenchingen (DE); Rene Dingelstadt, Stuttgart (DE)

(73) Assignee: Mahle International GmbH (DE)

( * ) Notice: Subject to any disclaimer, the term of this patent is extended or adjusted under 35 U.S.C. 154(b) by 293 days.

(21) Appl. No.: 14/453,071

(22) Filed: Aug. 6, 2014

(65) Prior Publication Data
US 2015/0040874 A1    Feb. 12, 2015

(30) Foreign Application Priority Data

Aug. 7, 2013 (DE) .......................... 10 2013 215 608

(51) Int. Cl.
*F02B 29/04* (2006.01)
*F01P 9/06* (2006.01)
(Continued)

(52) U.S. Cl.
CPC ....... *F02B 29/0443* (2013.01); *B60H 1/00271* (2013.01); *F01P 9/06* (2013.01); *F02B 29/0412* (2013.01); *F02B 29/0462* (2013.01);
(Continued)

(58) Field of Classification Search
CPC ............ F02B 29/0443; F02B 29/0412; F02B 29/0418; F02B 29/0425; F02B 29/0462; F02B 29/0456; F02B 29/0493; F28F 9/0234; F01P 3/22; F01P 2011/2015; F01P 2060/02; B60H 1/00271; B60H 2001/00307
See application file for complete search history.

(56) References Cited

U.S. PATENT DOCUMENTS 3,439,657 A * 4/1969 Gratzmuller .............. F01P 3/20
                                                    123/41.31
4,317,439 A * 3/1982 Emmerling ............... F01P 3/20
                                                      123/563
(Continued)

FOREIGN PATENT DOCUMENTS

DE   19818649 A1   10/1999
DE   19859129 A1    6/2000
(Continued)

OTHER PUBLICATIONS

European Search Report for EP14178848 dated Nov. 19, 2014.
(Continued)

*Primary Examiner* — Emmanuel Duke
(74) *Attorney, Agent, or Firm* — Fishman Stewart PLLC

(57) ABSTRACT

A cooling system for a supercharged internal combustion engine may include a charge air cooling circuit, in which a low-temperature coolant circulates and which may have a low-temperature charge air cooler for cooling charge air and a low-temperature coolant cooler for cooling the low-temperature coolant. The system may include a refrigerant circuit, in which a refrigerant circulates and which has a vaporizer for vaporizing the refrigerant and a condenser for condensing the refrigerant. The system may include a coupling heat exchanger for a fluidically separated, heat-transmitting coupling of the charge air cooling circuit with the refrigerant circuit. The coupling heat exchanger may be arranged in a vaporizer bypass of the refrigerant circuit thereby bypassing the vaporizer and be arranged in a coupling branch of the charge air cooling circuit. The coupling branch may branch off via a branching-off point from a feed of the charge air cooling circuit.

20 Claims, 6 Drawing Sheets

(51) Int. Cl.
*B60H 1/00* (2006.01)
*F01P 3/22* (2006.01)
*F01P 11/20* (2006.01)

(52) U.S. Cl.
CPC ........ *B60H2001/00307* (2013.01); *F01P 3/22* (2013.01); *F01P 2011/205* (2013.01); *F01P 2060/02* (2013.01); *Y02T 10/146* (2013.01)

(56) References Cited

U.S. PATENT DOCUMENTS

| | | | | |
|---|---|---|---|---|
| 5,215,044 | A * | 6/1993 | Banzhaf | F01P 1/00 123/41.05 |
| 5,394,854 | A * | 3/1995 | Edmaier | F01P 7/165 123/542 |
| 6,006,540 | A | 12/1999 | Coletti | |
| 2003/0221638 | A1 * | 12/2003 | Haase | F02B 29/0443 123/41.01 |
| 2006/0185362 | A1 * | 8/2006 | Rogg | F01P 7/165 60/599 |
| 2007/0186912 | A1 * | 8/2007 | Holzbaur | F01P 7/165 123/563 |
| 2008/0066697 | A1 * | 3/2008 | Raab | F01P 3/12 123/41.55 |
| 2008/0087402 | A1 * | 4/2008 | Burk | F02B 29/0443 165/101 |
| 2011/0041814 | A1 * | 2/2011 | Kardos | F01P 7/165 123/563 |
| 2011/0146266 | A1 * | 6/2011 | Weinbrenner | F02B 29/0412 60/599 |
| 2013/0333674 | A1 * | 12/2013 | Brinkmann | F02B 33/00 123/563 |

FOREIGN PATENT DOCUMENTS

| | | |
|---|---|---|
| DE | 10128877 A1 | 12/2002 |
| DE | 10203772 A1 | 4/2004 |
| DE | 102007004979 A1 | 8/2008 |
| DE | 102007061495 A1 | 6/2009 |
| DE | 102009051377 A1 | 5/2011 |
| DE | 102011116423 A1 | 5/2012 |
| EP | 0512307 A1 | 11/1992 |
| EP | 0909932 A2 | 4/1999 |
| EP | 1342892 A2 | 9/2003 |
| EP | 1500802 A1 | 1/2005 |
| EP | 1902877 A1 | 3/2008 |

OTHER PUBLICATIONS

English Abstract for EP1342892A2.
English Abstract for EP0512307A1.
English Abstract for EP1902877A1.
English Abstract for EP1500802A1.

* cited by examiner

COOLING SYSTEM AND ASSOCIATED OPERATING METHOD

CROSS-REFERENCE TO RELATED APPLICATIONS

This application claims priority to German Patent Application No. 10 2013 215 608.1 filed Aug. 7, 2013, the contents of which are hereby incorporated by reference in their entirety.

TECHNICAL FIELD

The present invention relates to a cooling system for a supercharged internal combustion engine, preferably in a motor vehicle, having the features of the introductory clause of claim 1. The invention also relates to a method for operating such a cooling system.

BACKGROUND

From DE 198 59 129 A1 a cooling system for a supercharged internal combustion is known, which comprises a charge air cooling circuit and a refrigerant circuit. A liquid low-temperature coolant circulates in the charge air cooling circuit. The charge air cooling circuit has a low-temperature charge air cooler for cooling the charge air, and a low-temperature coolant cooler for cooling the low-temperature coolant. On the other hand, a refrigerant circulates in the refrigerant circuit. The refrigerant circuit has a vaporiser for vaporising the refrigerant, and a condenser for condensing the refrigerant. In the known cooling system the vaporiser is coupled fluidically with the charge air cooling circuit, so that the heat required for the vaporising of the refrigerant is removed from the low-temperature coolant. Hereby, the cooling efficiency of the charge air cooling circuit can be improved.

A similar cooling system is known from U.S. Pat. No. 6,006,540. There, the vaporiser is arranged in a storage container for the storage of the low-temperature coolant, wherein this storage container is in turn arranged in a branch of the charge air cooling circuit, which is connected in parallel to a branch of the charge air cooling circuit containing the low-temperature coolant cooler. By means of corresponding valve means, the coolant flow in the charge air cooling circuit can be divided, depending on requirements, to the low-temperature coolant cooler and the storage container. Therefore, here also additional cooling efficiency can be realized in the charge air cooling circuit by coupling with the refrigerant circuit.

Through the use of a charging device, for example an exhaust gas turbocharger, the supercharging, i.e. the pressure increase of the charge air, takes place, which leads to an increase in efficiency of the internal combustion engine. The compression is necessarily accompanied here by an increase in temperature. By cooling the charge air, the density of the air can be increased and therefore the air mass flow can be increased, which can be supplied to combustion chambers of the internal combustion engine. At the same time, improved pollutant emission values can be thereby realized. In particular, through cooling, the tendency to the formation of nitrogen oxides is reduced. Through the supercharging of the charge air, the internal combustion engine can therefore realize a comparatively high efficiency or respectively high loads. For these upper charge states, which are designated below as "full load", it generally applies that the more intensive the cooling of the charge air, the better for the efficiency and the pollutant emissions of the internal combustion engine.

However, internal combustion engines in vehicles are not operated permanently in these upper load states, i.e. at full load. Rather, in fact in road traffic there are a variety of situations in which the internal combustion engine only has to be operated with low load or even only with basic load, so-called "idle mode", for example, in typical stop-and-go situations and in the case of stopping at traffic lights. In these operating states of the internal combustion engine in the lower load range, which is designated in simplified form below as "partial load", it has been found that an intensive cooling of the charge air is counterproductive with regard to the pollutant emissions of the internal combustion engine and with regard to the overall energy efficiency of the internal combustion engine. For example, the active cooling of the charge air requires energy which must be produced by the internal combustion engine. Furthermore, a reduced compatibility with respect to an exhaust gas recirculation can occur, when the charge air is too cold at partial load.

Accordingly, the need exists to cool the charge air only depending on requirements. Ideally, the charge air is therefore only to be cooled at full load, whereas at partial load it is supplied virtually uncooled to the combustion chambers of the internal combustion engine. Additional advantages thereby result for the partial load operation. Since with uncooled charge air with a greater volume flow a smaller air mass flows to the combustion chambers, a throttle valve of a fresh air system, which serves for controlling the air mass supplied to the combustion chambers, can be opened further, so that as a whole the throttle losses on the fresh air side can be reduced.

A problem here is that in the operation of the internal combustion engine, in particular in the case of a use in a motor vehicle, the various operating states, i.e. partial load and full load, can follow one another very rapidly. For reasons of comfort, it is required here that a transient state, which defines the transition from the partial load to the full load, is as short as possible. The internal combustion engine is to react as immediately as possible to an increased efficiency requirement. In supercharged internal combustion engines which operate with an exhaust gas turbocharger, in fact the so-called "turbo lag" can occur here. The response time of the turbocharger can be extremely improved by costly measures within the exhaust gas turbocharger, such as for example by a variable turbine geometry and/or by a waste gate valve. In particular, a modern turbocharger therefore requires less time than a conventional cooling system, in order to be transferred from the partial load into the full load. Therefore, the necessary high charge pressure is indeed available in an acceptable time, however, the compressed and thereby heated charge air can not be cooled sufficiently rapidly so that the required efficiency of the internal combustion can not yet be provided. This is only possible when the charge air cooling can also develop its full efficiency.

The need therefore exists to provide for a supercharged internal combustion engine a cooling system which has an as short as possible transient state for the transition from partial load to full load, in order to be able to realize a sufficient cooling of the charge air as rapidly as possible.

SUMMARY

The present invention is concerned with the problem of indicating, for a cooling system of the type mentioned in the introduction and for an associated operating method, an improved embodiment which is distinguished in particular in that a changeover can be made in as short a time as possible from a state with reduced cooling of the charge air for a partial load operation of the internal combustion engine to a state with increased cooling of the charge air for a full load operation of the internal combustion engine.

This problem is solved according to the invention by the subjects of the independent claims. Advantageous embodiments are the subject of the dependent claims.

The invention is based on the general idea of not coupling the charge air cooling circuit and the refrigerant circuit with one another directly via the vaporiser, but rather indirectly, namely via a coupling heat exchanger, which is arranged for this on the one hand in a controlled, or respectively controllable by corresponding valve means, vaporiser bypass of the refrigerant circuit, bypassing the vaporiser, and on the other hand in a controlled, or respectively controllable by corresponding means, coupling branch of the charge air cooling circuit. Via the coupling heat exchanger, a fluidically separated, heat-transmitting coupling is therefore realized between the charge air cooling circuit and the refrigerant circuit. By the arrangement of the coupling heat exchanger in a vaporiser bypass, it is possible to also operate the refrigerant circuit when a heat absorption from the charge air cooling circuit is not necessary. In particular, this type of construction is suitable for using a refrigerant circuit, which is present in any case in the vehicle, additionally for cooling the charge air. For example, nowadays almost every motor vehicle is equipped with an air-conditioning system for controlling the temperature of a passenger compartment, which comprises such a refrigerant circuit. Through the controllability of the vaporiser bypass, the coupling heat exchanger can be simply switched on or off according to requirements. Likewise, any desired intermediate positions are possible, which contain a partial connection. In this respect, an improved transient behaviour is produced for the cooling system.

The proposed coupling branch according to the invention, for accommodating the coupling heat exchanger, branches off here via a branching-off point arranged upstream of the low-temperature charge air cooler, from a feed of the charge air cooling circuit which leads from the low-temperature coolant cooler to the low-temperature charge air cooler. Hereby, it is achieved that the coupling heat exchanger does not have to be flowed through by the low-temperature coolant in every case, because it is arranged in the coupling branch virtually parallel to the feed. Through the controllability of the coupling branch, the coupling heat exchanger can also be switched on or respectively off here in a simple manner. Likewise, basically any desired intermediate stages or respectively flow divisions are also conceivable here. The accommodating of the coupling heat exchanger in the coupling branch has, in addition, the crucial advantage that the coupling heat exchanger can be uncoupled from the charge air cooling circuit in the case of partial load, so that it is not flowed through by the low-temperature coolant, whilst at the same time it can be cooled by means of the refrigerant circuit and kept at a correspondingly low temperature level, for which reason it is flowed through more or less by the refrigerant. For the transition to full load, this means that the cooling efficiency of the coupling heat exchanger is immediately available, in order to cool the low-temperature coolant. Therefore, the thermal inertia is taken from the charge air cooling circuit, which considerably reduces the necessary time for the transient state.

According to an advantageous embodiment, the coupling branch can be directed back into the feed of the charge air cooler via a feedback point arranged upstream of the low-temperature charge air cooler and downstream of the branching-off point. Hereby, a particularly simple construction is produced. At full load, the entire cooling efficiency of the coupling heat exchanger can be used for cooling the low-temperature coolant, which is subsequently directed as a whole through the low-temperature charge air cooler, in order to cool the charge air there.

In an alternative embodiment, the coupling branch can contain a low-temperature charge air cooler for cooling the charge air and can be directed back via a feedback point arranged downstream of the low-temperature charge air cooler into a return of the charge air cooling circuit leading from the low-temperature charge air cooler to the low-temperature coolant cooler. In this case, an at least two-stage cooling of the charge air is realized, namely on the one hand in the low-temperature charge air cooler and on the other hand in the cryogenic charge air cooler. In full load operation, the low-temperature coolant, cooled only by the low-temperature coolant cooler, can cool the charge air in the low-temperature charge air cooler, whereas the low-temperature coolant cooled by the low-temperature coolant cooler and the coupling heat exchanger cools the charge air in the cryogenic charge air cooler. Hereby, the charge air can be cooled particularly efficiently.

Expediently, the feed is controlled between the branching-off point and the low-temperature charge air cooler, or respectively is configured so as to be controllable with corresponding valve means, whereby at full load virtually any desired distribution of the low-temperature coolant to the low-temperature charge air cooler and to the cryogenic charge air cooler is able to be adjusted.

In an advantageous further development, the cryogenic charge air cooler can be arranged in the charge air path downstream of the low temperature charge air cooler, so that the low temperature charge air cooler brings about a precooling of the charge air, whilst the cryogenic charge air cooler brings about an after-cooling of the charge air.

In another particularly advantageous further development, the cryogenic charge air cooler and the low temperature charge air cooler can be constructed in a shared cooler block or heat exchanger block, whereby the realization of this embodiment is particularly economically priced. A typical heat exchanger block consists of a plurality of parallel tubes which are able to be flowed through by the respective coolant and which have spaces between them which are able to be flowed through by the charge air and in which generally a plurality of plates and suchlike heat transmission structures are arranged. Some of these tubes can now define, within the heat exchanger block, a low temperature region which forms the low-temperature charge air cooler, whilst other tubes then define a cryogenic region in the heat exchanger block, which forms the cryogenic charge air cooler.

According to another advantageous further development, the coupling branch can be fluidically connected between the coupling heat exchanger and the cryogenic charge air cooler via a controlled, or respectively controllable by means of corresponding valve means, connection with the feed. Through this measure, it is possible for partial load operation to flood the cryogenic charge air cooler, with uncoupled coupling heat exchanger, with low-temperature coolant which comes from the low-temperature coolant cooler, whereby the cryogenic charge air cooler and the low-temperature charge air cooler can be kept at the same temperature level. Hereby, the thermal mass of the cryogenic charge air cooler reduces from its wet mass to its dry mass. The dry mass corresponds to the heat exchanger block without coolant, whereas the wet mass comprises the heat exchanger block with coolant. For full load operation, the connection can now be blocked, so that then a part of the low-temperature coolant coming from the coupling heat exchanger then flows through the cryogenic charge air cooler, whilst a part of the low-temperature coolant which is directed past the coupling heat exchanger is fed to the low-temperature charge air cooler.

According to another advantageous embodiment, a high-temperature cooling circuit can be provided, in which a liquid high-temperature coolant circulates and which has a high-temperature charge air cooler for cooling the charge air and a high-temperature coolant cooler for cooling the high-temperature coolant. In this way, also, an at least two-stage cooling of the charge air can be realized. In connection with the cryogenic charge air cooler already mentioned above, even a three-stage charge air cooling can be realized.

Expediently, the high-temperature charge air cooler is arranged here in the charge air path upstream of the low-temperature charge air cooler. The high temperature coolant lies in the normal operating state of the internal combustion engine at a higher temperature level than the low-temperature coolant. Nevertheless, a pre-cooling of the charge air can be realized via the high-temperature charge air cooler, which improves the cooling efficiency of the cooling system as a whole.

According to an advantageous further development, provision can be made to integrate the high-temperature charge air cooler and the low-temperature charge air cooler structurally into a shared cooler block. This can take place in a tubular heat exchanger particularly simply by a suitable association of the individual tubes with the low-temperature cooling circuit on the one hand and with the high-temperature cooling circuit on the other hand. In so far as a cryogenic charge air cooler is also provided, a cooler block can also be realized in which the three different coolers, namely high-temperature charge air cooler, low temperature charge air cooler and cryogenic charge air cooler, are homogeneously constructed in an integral manner. In a tubular heat exchanger, this can again be realized particularly simply in that some of the tubes are associated with the high-temperature charge air cooler, some other tubes are associated with the low-temperature charge air cooler and the remaining tubes are associated with the cryogenic charge air cooler.

The low-temperature charge air cooler can generally be preferably integrated into a charge air distributor which feeds the charge air, coming from the respective charging device, in particular via separate connecting lines, separately to the individual combustion chambers. The same applies for a cooler block into which the low-temperature charge air cooler and/or the cryogenic charge air cooler and/or the high-temperature charge air cooler are integrated.

The high-temperature cooling circuit can concern, for example, an engine cooling circuit for cooling an engine block of the internal combustion engine. Such an engine cooling circuit is also as a rule present in any case in an internal combustion engine, so that the expenditure for realizing the high-temperature charge air cooler is comparatively low. The high-temperature coolant cooler is exposed here to a cooling air flow in a conventional manner.

The high-temperature coolant cooler of the high-temperature cooling circuit or respectively of the engine cooling circuit can be arranged here expediently in a cooling air path, and namely preferably downstream of the low-temperature coolant cooler which is likewise arranged in this cooling air path.

The relative indications "low-temperature", "cryogenic" and "high-temperature" refer here to the charge air, so that the charge air is indeed cooled in the high-temperature cooler, nevertheless has a higher temperature thereafter than after the low-temperature charge-air cooler, whereas after the cryogenic charge air cooler it has a lower temperature than after the low-temperature charge air cooler.

In another embodiment, a latent heat storage unit for cooling the low-temperature coolant can be integrated into the coupling heat exchanger. In operating phases in which the refrigerant circuit is already highly loaded, so that it can not receive any additional heat from the low-temperature cooling circuit, the latent heat storage unit in the coupling heat exchanger, on changing from partial load to full load, temporarily enables a sufficient cooling of the low-temperature coolant.

In another embodiment, the vaporiser can be arranged in a gas path, so that a gas flow leads through the vaporiser, wherein a latent heat storage medium or latent medium for cooling the gas flow flowing through the vaporiser can be integrated into the vaporiser. Through this type of construction, on switching on the coupling heat exchanger, the influence on the gas outlet temperature at the vaporiser can be minimised and intercepted a short time, so that the regulation of the refrigerant circuit is simplified and no losses of comfort have to be recorded. This damping effect can be realized by a latent medium.

According to a particularly advantageous embodiment, the refrigerant circuit can concern an air-conditioning circuit for cooling an air flow which is to be fed to a passenger compartment of the vehicle, so that an air path, directing the air flow, is directed through the vaporiser. The refrigerant circuit therefore concerns an air-conditioning circuit which is present in any case in modern vehicles, which can be used in addition for cooling the charge air.

In another advantageous embodiment, the low-temperature coolant cooler can be arranged in a cooling air path, so that a cooling air flow is directed through the low-temperature coolant cooler, whilst the condenser is arranged upstream of the low-temperature coolant cooler in the cooling air path. In this case, the condenser is therefore cooled directly by the cooling air flow. Basically, it is possible to arrange the condenser and low-temperature coolant cooler in a shared heat exchanger module. Furthermore, it is possible to arrange the previously mentioned high-temperature coolant cooler of the high-temperature cooling circuit in the same cooling air path, expediently downstream of the low-temperature coolant cooler. Here, also, an integration in a shared heat exchanger module of the high-temperature coolant cooler and of the low-temperature coolant cooler and optionally of the condenser is also theoretically conceivable.

In an alternative embodiment, the low-temperature coolant cooler can be arranged again in a cooling air path, so that a cooling air flow is directed through the low-temperature coolant cooler. In this alternative embodiment, on the other hand, the condenser for the fluidically separated, heat-transmitting coupling of the refrigerant circuit with the charge air cooling circuit can be integrated into the charge air cooling circuit upstream of the low-temperature coolant cooler. In this case, the condenser is only coupled indirectly with the cooling air flow, namely via the charge air cooling circuit. Through this measure, a large-volume condenser, to be exposed to the cooling air path, is dispensed with, because the indirect condenser, flowed through by the liquid low-temperature coolant, is able to be realized distinctly more compactly in this type of construction. The structural space gained by the omission of the condenser in the front end can then be filled by an enlarged low-temperature coolant cooler, so that in the vehicle a low-temperature coolant circuit with increased efficiency is available, which can be distributed flexibly to the indirect re-cooling components according to the focus of application. Owing to partially complementary critical high load scenarios of condenser and low-temperature charge air cooler, as a whole a cooling system is produced which is more efficient in the partial aspects.

The method according to the invention, by means of which a cooling system of the type described above can be operated, is characterized in that the charge air cooling circuit is able to be switched, depending on the cooling requirement of the charge air, at least between a first cooling efficiency stage and a second cooling efficiency stage, wherein in the first cooling efficiency stage the coupling heat exchanger is not flowed through by the low-temperature coolant. In the first cooling efficiency stage, the coupling heat exchanger is cooled or respectively kept cooled by means of the refrigerant present in the refrigerant circuit. In the second cooling efficiency stage, the low-temperature coolant cooler and the coupling heat exchanger is flowed through by the low-temperature coolant. In this way, the wet mass of the coupling heat exchanger is directly available for the full load operation, which extremely shortens the response time of the cooling system for a load change from partial load to full load. The first cooling efficiency stage does not realize any, or a relatively low cooling efficiency and is associated with the partial load. The second cooling efficiency stage, on the other hand, produces a relatively high cooling efficiency and is associated with the full load.

In a further development, provision is made that in the first cooling efficiency stage the low-temperature coolant flows through the low-temperature charge air cooler. Here, a low-temperature pump which drives the low-temperature coolant in the charge air cooling circuit, can be reduced with regard to its conveying capacity. Alternatively, the low-temperature pump can be switched off for the first cooling efficiency stage.

In another further development, in the second cooling efficiency stage a first partial flow of the low-temperature coolant can flow through the low-temperature charge air cooler, bypassing the coupling heat exchanger, whilst a second partial flow of the low-temperature coolant flows through the coupling heat exchanger and thereafter through the cryogenic charge air cooler. Hereby, for the second cooling efficiency stage, a two-stage charge air cooling with the low-temperature charge air cooler and cryogenic charge air cooler is realized.

According to another advantageous embodiment, in the first cooling efficiency stage a total flow of the low-temperature coolant can bypass the coupling heat exchanger and flow in two partial flows in parallel through the low-temperature charge air cooler and the cryogenic charge air cooler. Hereby, the temperatures of the low-temperature charge air cooler and cryogenic charge air cooler are adjusted in order to achieve a pre-cooling both of the low-temperature charge air cooler and also of the cryogenic charge air cooler. This can also take place with reduced conveying capacity of the low-temperature pump.

In another advantageous embodiment, for a switching process from the first cooling efficiency stage into the second cooling efficiency stage, additional cooling efficiency can be provided by means of at least one latent heat storage unit.

Such a latent heat storage unit can be designed particularly simply so that if necessary for a predetermined, comparatively short time, for example for approximately 30 seconds, it can remove heat from the low-temperature coolant sufficiently in order to provide the desired cooling efficiency for the transient state.

Further important features and advantages of the invention will emerge from the subclaims, from the drawings and from the associated description of figures with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown, respectively diagrammatically.

DETAILED DESCRIPTION

Figure 1:
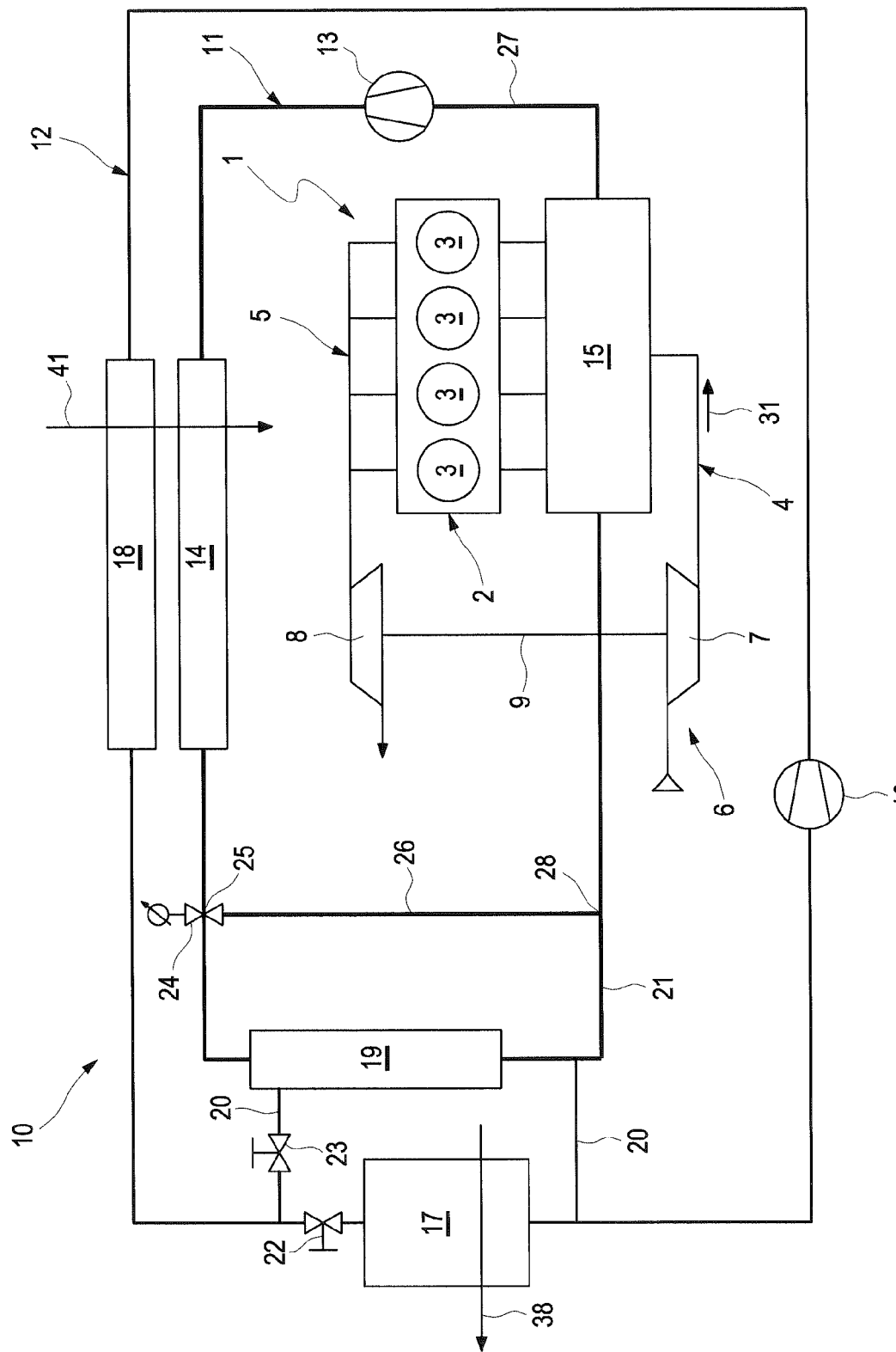
FIGS. 1 to 6 respectively a schematic diagram in the manner of a circuit diagram of a cooling system in different embodiments.

According to FIGS. 1 to 6, an internal combustion engine 1 comprises in a conventional manner an engine block 2 with several combustion chambers 3, which are formed by cylinders, in which pistons are arranged in a stroke-adjustable manner. The internal combustion engine 1 is equipped with a fresh air system 4 for supply with fresh air, which fresh air system feeds fresh air to the combustion chambers 3. For the removal of exhaust gas from the combustion chambers 3, the internal combustion engine 1 is equipped with an exhaust gas system 5. The internal combustion engine 1 is configured as a supercharged internal combustion engine 1 and therefore has a charging device 6, which is formed here by an exhaust gas turbocharger, which is likewise designated by 6. The exhaust gas turbocharger 6 has a compressor 7, which is arranged in the fresh air system 4. In addition, the exhaust gas turbocharger 6 has a turbine 8, which is arranged in the exhaust gas system 5. The compressor 7 is in drive connection with the turbine 8 via a drive shaft 9.

The internal combustion engine 1 is additionally equipped with a cooling system 10, which comprises a charge air cooling circuit 11 and a refrigerant circuit 12. The charge air cooling circuit 11 contains a low-temperature pump 13, a low-temperature coolant cooler 14 and a low-temperature charge air cooler 15. During operation, a liquid low-temperature coolant circulates in the charge air cooling circuit 11, which coolant is driven for this by the low-temperature pump 13. In contrast thereto, a phase-changing refrigerant circulates in the refrigerant circuit 12. The refrigerant circuit 12 contains a compressor 16 for driving the refrigerant, a vaporiser 17 for vaporising the refrigerant, and a condenser 18 for condensing the refrigerant.

The cooling system 10 is equipped in addition with a coupling heat exchanger 19, which enables a fluidically separated heat transmitting coupling between the charge air cooling circuit 11 and the refrigerant circuit 12. For this, the coupling heat exchanger 19 is integrated on the one hand into a vaporiser bypass 20 of the refrigerant circuit 12, which bypasses the vaporiser 17. On the other hand, the coupling heat exchanger 19 is integrated into a coupling branch 21 of the charge air cooling circuit 11. The distribution of a flow of refrigerant to the vaporiser 17 and to the coupling heat exchanger 19 is controllable by means of suitable control valves 22, 23. Hereby, at least the vaporiser bypass 20 is controllable or respectively controlled. The coupling branch 21 can likewise be controlled, and namely for example by means of a corresponding control valve 24. The coupling branch 21 is branched off here via a branching-off point 25 from a feed 26 of the charge air cooling circuit 11. The feed 26 leads from the low-temperature coolant cooler 14 to the low-temperature charge air cooler 15. In contrast thereto, a return 27 of the charge air cooling circuit 11 leads from the low-temperature charge air cooler 15 to the low-temperature coolant cooler 14. The branching-off point 25 is therefore arranged upstream of the low-temperature charge air cooler 15.

In the embodiment shown in FIG. 1, the coupling branch 21 is directed back into the feed 21 of the charge air cooling circuit 11 via a feedback point 28 arranged upstream of the low-temperature charge air cooler 15 and downstream of the branching-off point 25.

In the embodiments of FIGS. 2 to 6, on the other hand, the feedback point 28 of the coupling branch 21 is arranged at the return 27, i.e. downstream of the low-temperature charge air cooler 15. In these embodiments, a cryogenic charge air cooler 29 is arranged in the coupling branch 21, which cooler also serves for cooling the charge air. In this case, the feed 26 can be controlled between the branching-off point 25 and the low-temperature charge air cooler 15, for example by means of a corresponding control valve 30. The cryogenic charge air cooler 29 is arranged in a charge air path 31 directed in the fresh air system 4, downstream of the low-temperature charge air cooler 15. Expediently, the cryogenic charge air cooler 29 and the low-temperature charge air cooler 15 are constructed in a shared heat exchanger block or respectively cooler block 32.

Figure 2:
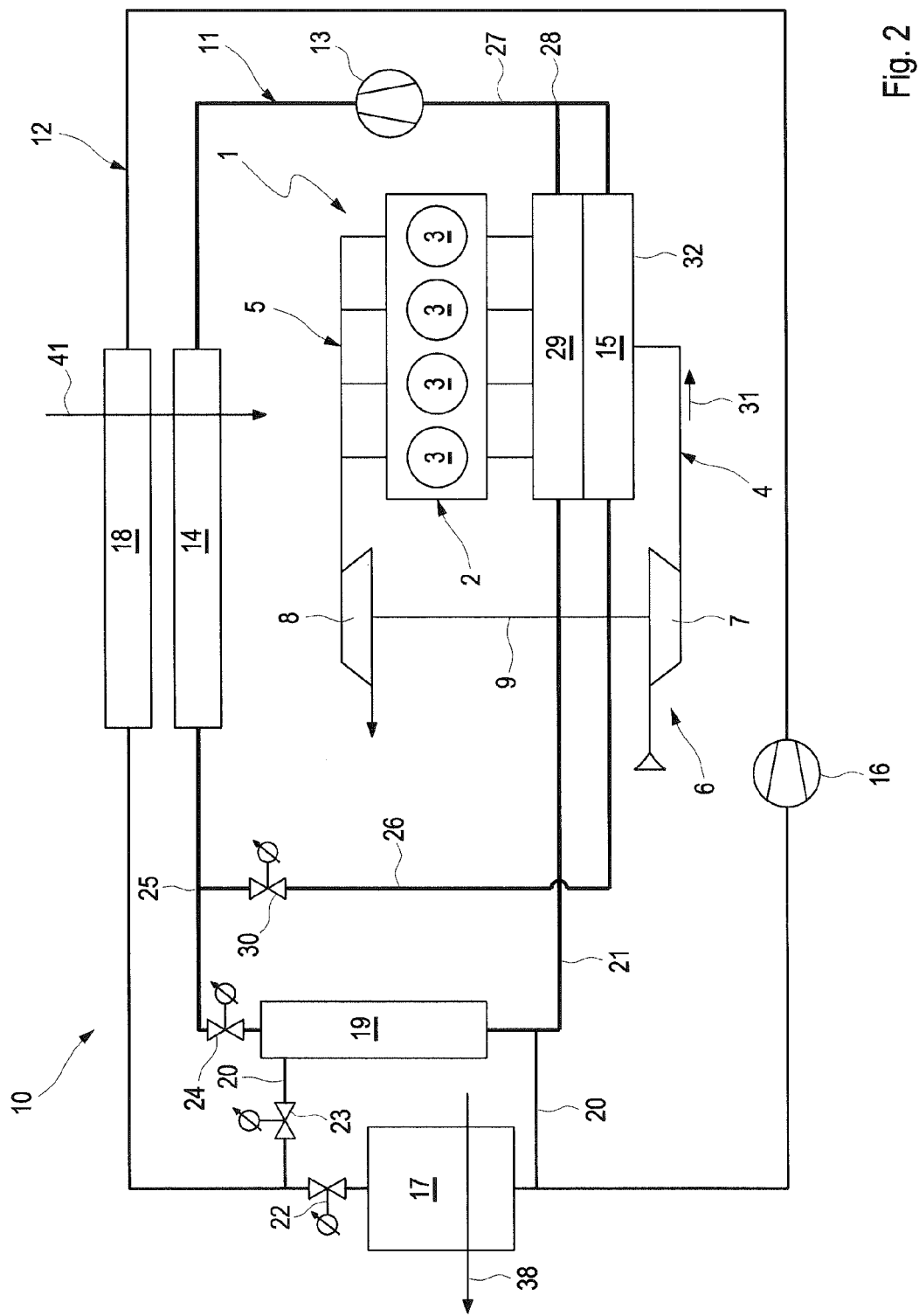

According to FIGS. 3 to 6, in improved embodiments of the variants shown in FIGS. 1 and 2, a connection 33 can be provided, which fluidically connects with the feed 26 the coupling branch 21 between the coupling heat exchanger 19 and the cryogenic charge air cooler 29. The connection 33 is controlled here, for which it can be equipped with a suitable control valve 34.

Figure 3:
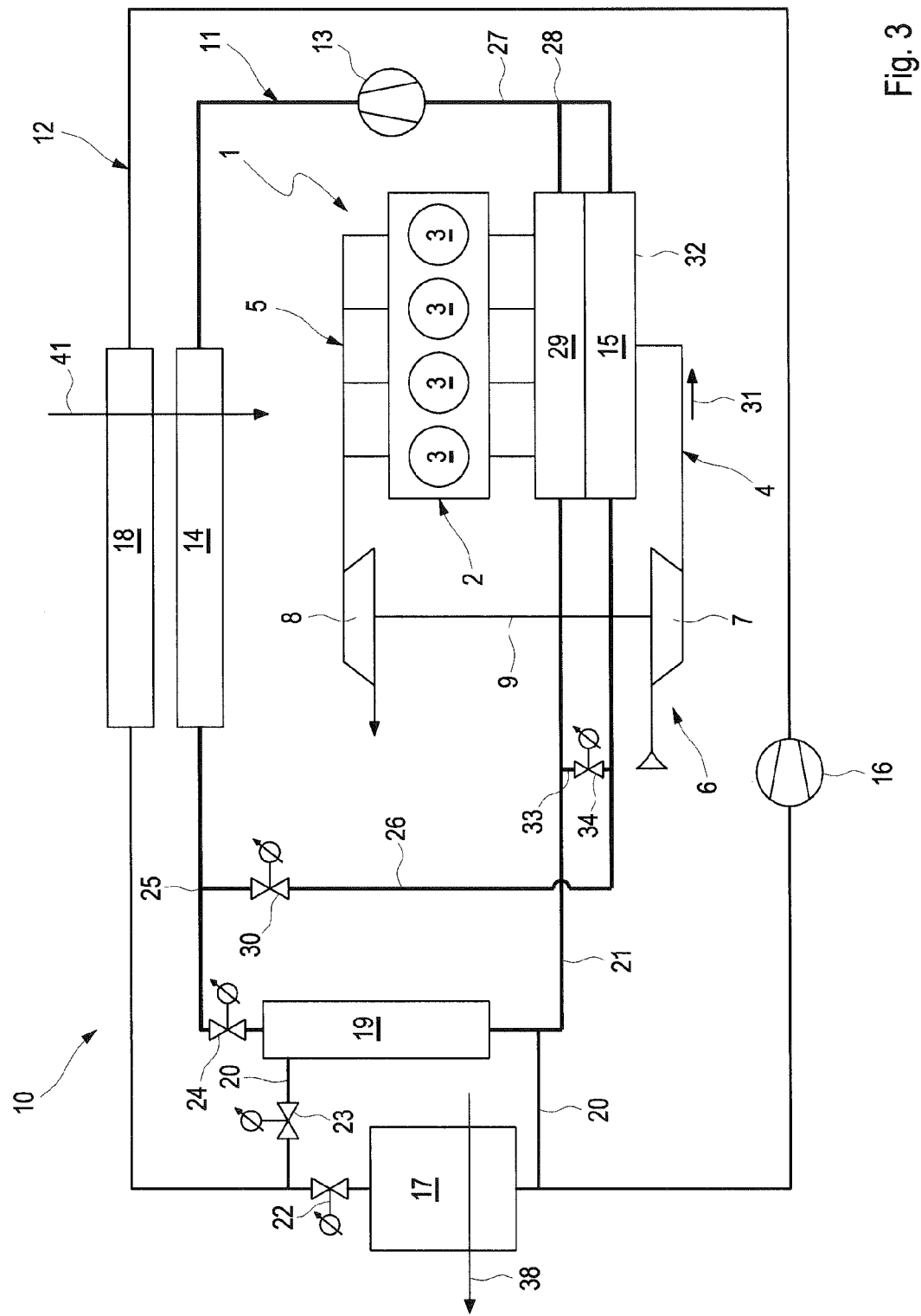
Figure 4:
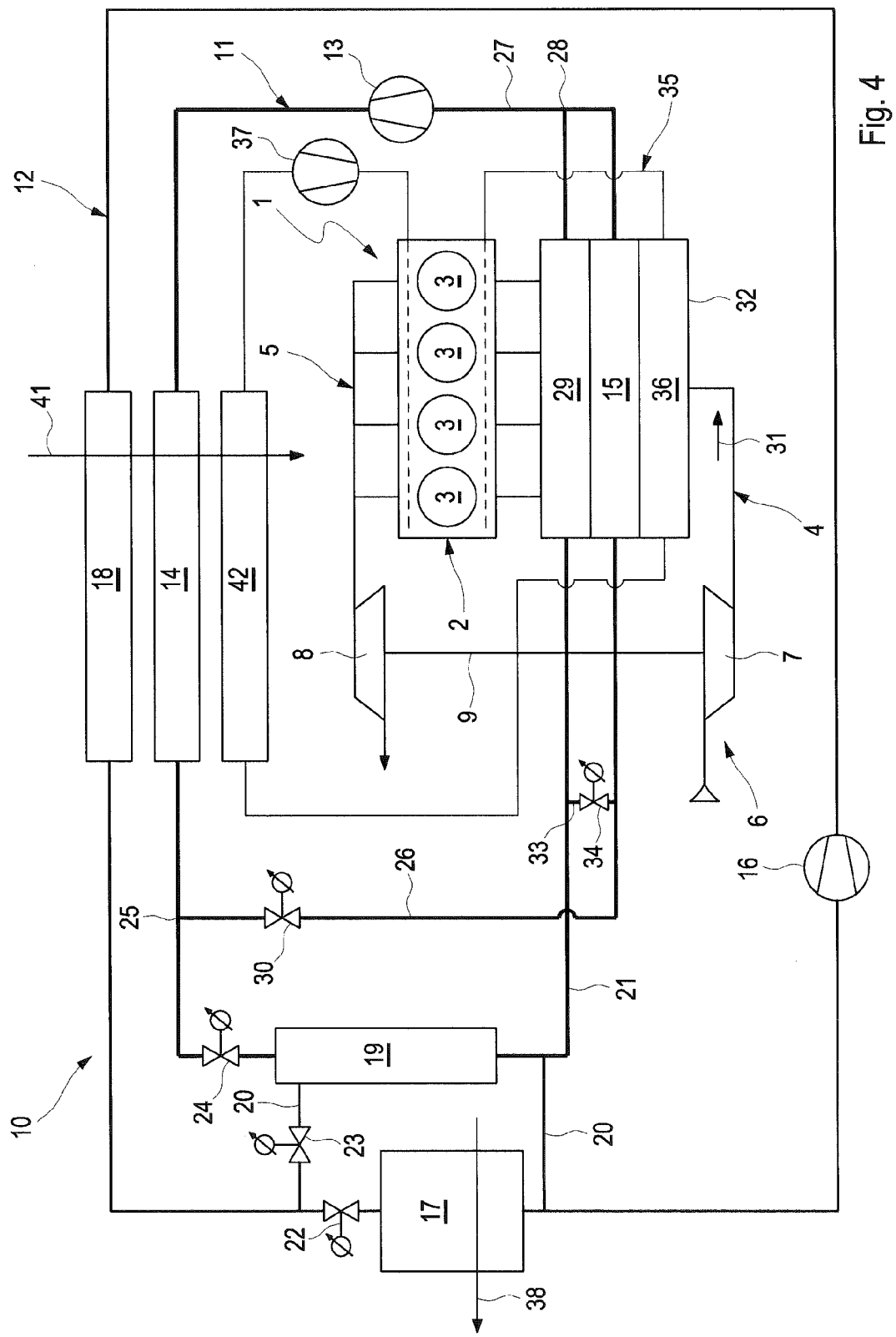
Figure 5:
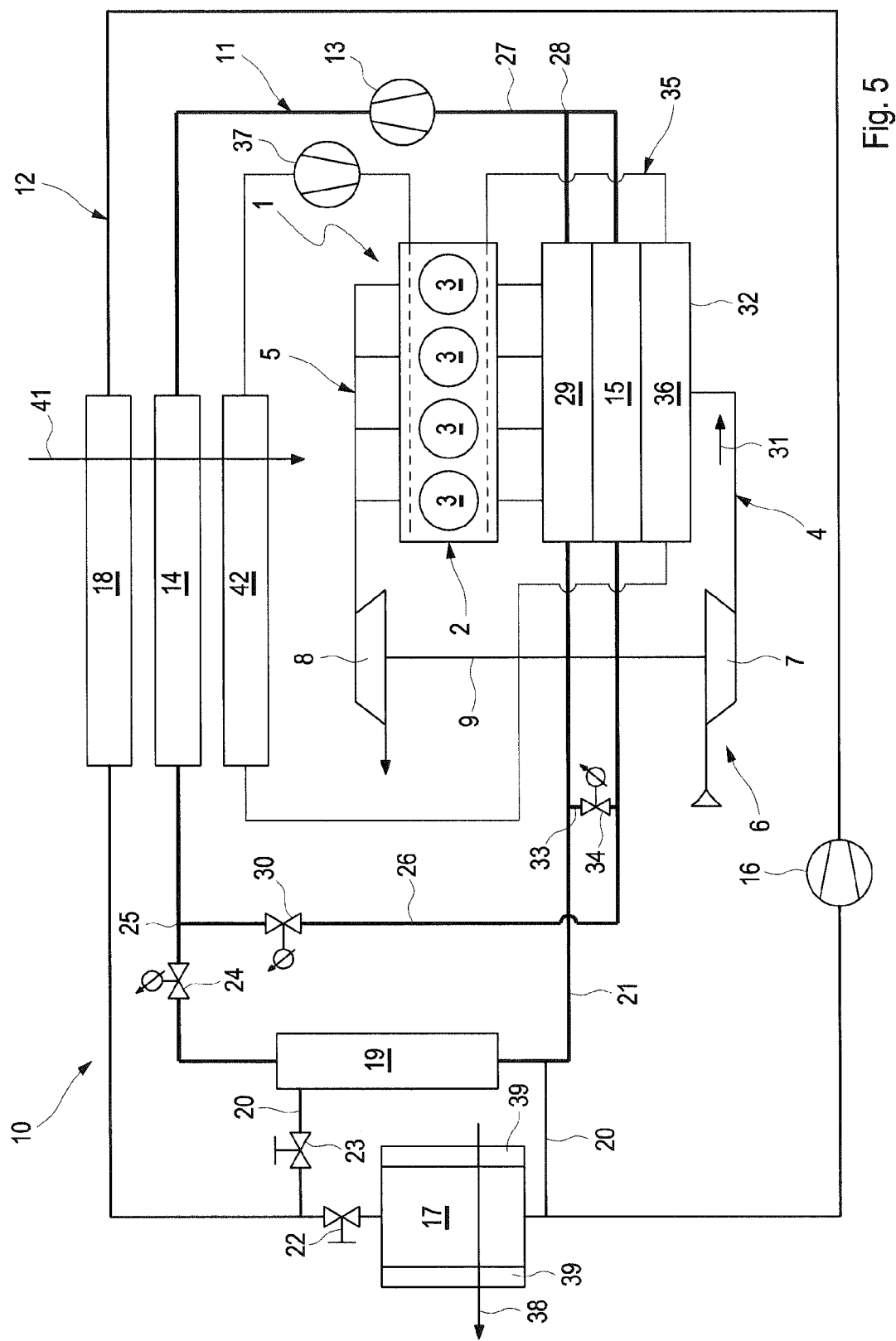
Figure 6:
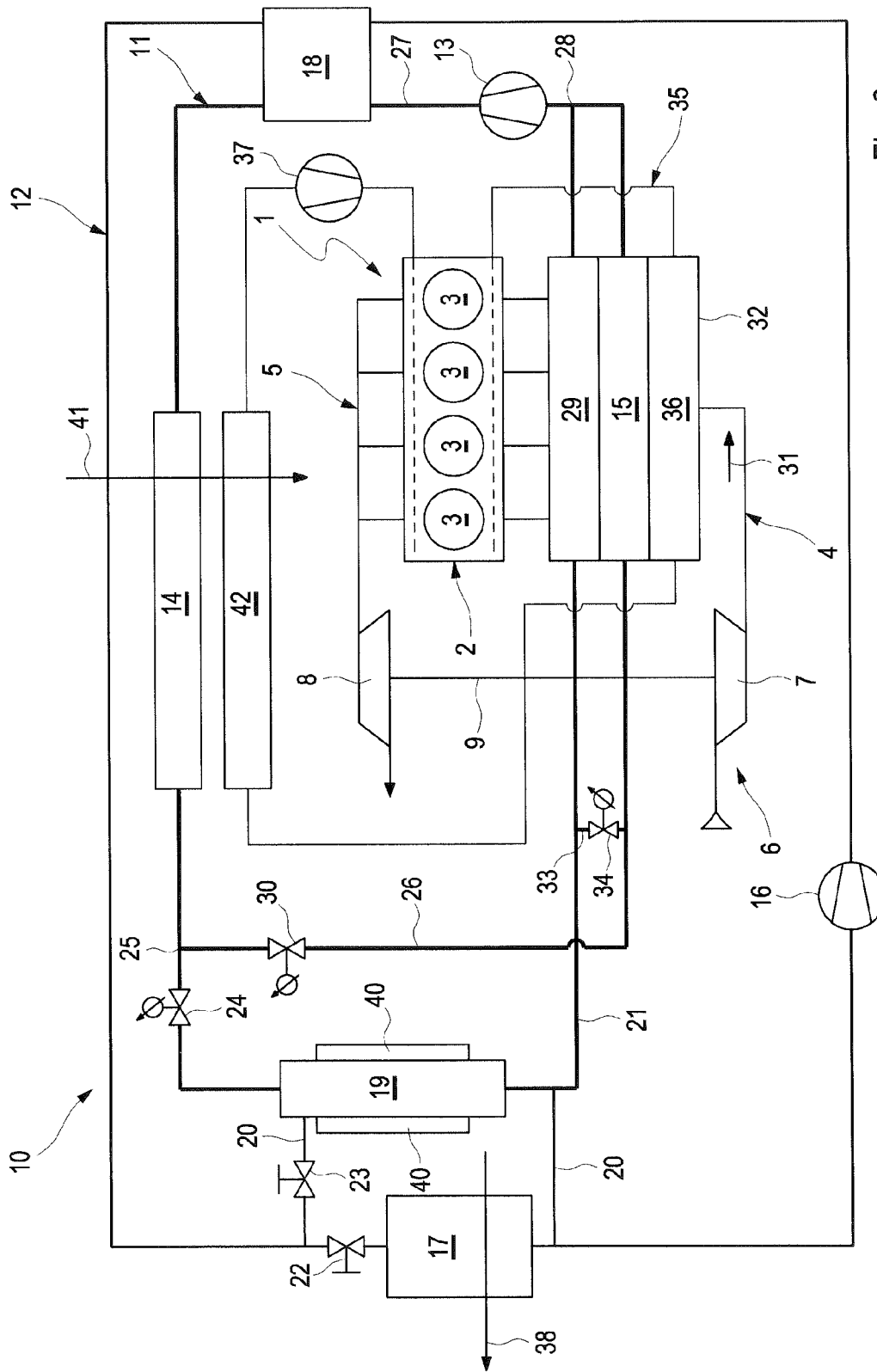

The embodiments shown in FIGS. 4 to 6 differ from the embodiments shown in FIGS. 1 to 3 by a high-temperature cooling circuit 35, in which a liquid high-temperature coolant circulates. The high-temperature cooling circuit 35 contains a high-temperature charge air cooler 36 for cooling the charge air, and a high-temperature coolant cooler 37 for cooling the high-temperature coolant.

In the examples shown here, the high-temperature cooling circuit 35 concerns an engine cooling circuit for cooling the engine block 2, wherein the circuitry shown here is selected purely by way of example. The engine cooling circuit is therefore also designated below by 35. In particular, the high-temperature charge air cooler 36 can be integrated into a separate branch of the engine cooling circuit 35. The high-temperature charge-air cooler 36 is arranged in the charge air path 31 upstream of the low-temperature charge air cooler 15. Expediently, the high-temperature charge air cooler 36 is integrated structurally into the cooler block 32, into which also the low-temperature charge air cooler 15 and, if present, also the cryogenic charge air cooler 29, are constructed. The engine cooling circuit 35 contains here in a conventional manner a high-temperature pump 37 for driving the high-temperature coolant.

In the embodiments of FIGS. 1 to 6, the refrigerant circuit 12 serves for cooling an air flow 38. The air flow 38 can be fed here to a passenger compartment of the vehicle. Accordingly, the refrigerant circuit 12 concerns an air-conditioning circuit, which can also be designated below by 12. Through the vaporiser 17, therefore, an air path, not designated in further detail, is directed, which directs the air flow 38.

In the embodiment shown in FIG. 5, a latent heat storage unit 39 is integrated into the vaporiser 17, by means of which the air flow 38 flowing through the vaporiser 17 can be cooled. In contrast thereto, FIG. 6 shows an embodiment in which a latent heat storage unit 40 is integrated into the coupling heat exchanger 19, which latent heat storage unit serves for cooling the low-temperature coolant. It is clear that basically in all the embodiments shown, such a latent heat storage unit 39 can be present in the vaporiser 17 or respectively a latent heat storage unit 40 can be present in the coupling heat exchanger 19.

Also, the increased thermal inertia of the partial circuits, caused by the latent medium, can be realized structurally in an independent component.

In the embodiments of FIGS. 1 to 6, the low-temperature coolant cooler 14 is arranged in a cooling air path 41, such that a cooling air flow is directed through the low-temperature coolant cooler 14. In the embodiments of FIGS. 1 to 5, the condenser 18 is arranged upstream of the low-temperature coolant cooler 14 in the said cooling air flow or respectively cooling air path 41. Basically, also, the high-temperature coolant cooler 37 can be arranged in this cooling air path 41, then, however, expediently downstream of the low-temperature coolant cooler 14.

In the embodiment shown in FIG. 6, the condenser 18 is integrated into the charge air cooling circuit 11 upstream of the low-temperature coolant cooler 14, in order to thus achieve a fluidically separated heat transmission between the refrigerant circuit 12 and the charge air cooling circuit 11. The arrangement or respectively configuration of the condenser 18 according to FIG. 6 can be designated as an indirect condenser 18, whilst the arrangement or respectively configuration of the condenser 18 according to FIGS. 1 to 5 can be designated as a direct condenser 18. The indirect condenser 18 is integrated here into the return 27 of the charge air cooling circuit 11.

The cooling system of FIGS. 1 to 6 which is presented here can be operated as follows. The charge air cooling circuit 11 can be able to be switched at least between two different cooler efficiency stages. Here, depending on the cooling requirement of the charge air, a switchover can take place for example between a first cooling efficiency stage and a second cooling efficiency state. The second cooling efficiency stage provides more cooling efficiency here than the first cooling efficiency stage. For example, the charge air can have a small cooling requirement when the internal combustion engine 1 is operated only in the lower load range, i.e. at partial load. A high cooling requirement is then present when the internal combustion engine 1 is operated in a higher and upper load range, i.e. at full load.

In the first cooling efficiency stage, the coupling heat exchanger 19 is not flowed through by the low-temperature coolant, whereby it is fluidically uncoupled from the remaining charge air cooling circuit 11. At the same time, the coupling heat exchanger 19 is cooled during the first cooling efficiency stage by means of the refrigerant circuit 12. In the second cooling efficiency stage, the low-temperature coolant cooler 14 and the coupling heat exchanger 19 can now be flowed through by the low-temperature coolant. Hereby, within a short time a large amount of cooling efficiency can be provided, in order to be able to cool the charge air rapidly on a changeover from partial load into full load.

Basically, provision can be made here that in the first cooling efficiency stage the low-temperature coolant flows through the low-temperature charge air cooler 15, so that therefore the low-temperature pump 13 is in operation. Here, the low-temperature pump 13 can have a comparatively low or respectively a reduced conveying capacity. Likewise, it is basically possible to completely switch off the low-temperature pump 13 during the first cooling efficiency stage.

In the second cooling efficiency stage, at least in the embodiments of FIGS. 2 to 6, a first partial flow of the low-temperature coolant can flow through the low-temperature charge air cooler 15, bypassing the coupling heat exchanger 19, whilst a second partial flow of the low-temperature coolant flows through the coupling heat exchanger 19 and thereafter through the cryogenic charge air cooler 29.

The embodiments of FIGS. 3 to 6, in which the connection 33 is provided, enable for the first cooling efficiency stage a dividing of a total flow of the low-temperature coolant, bypassing the coupling heat exchanger 19, into two partial flows, which flow through the low-temperature charge air cooler 15 and the cryogenic charge air cooler 29 in a parallel manner.

On switching over form the first cooling efficiency stage into the second cooling efficiency stage, additional cooling efficiency can be provided in the embodiments shown in FIGS. 5 and 6 by means of at least one latent heat storage unit 39 or respectively 40.

The invention claimed is:

1. A cooling system for a supercharged internal combustion engine, comprising:
    a charge air cooling circuit, in which a low-temperature coolant circulates and which has a low-temperature charge air cooler for cooling charge air and a low-temperature coolant cooler for cooling the low-temperature coolant,
    a refrigerant circuit, in which a refrigerant circulates and which has a vaporiser for vaporising the refrigerant and a condenser for condensing the refrigerant,
    a coupling heat exchanger for a fluidically separated, heat-transmitting coupling of the charge air cooling circuit with the refrigerant circuit, the coupling heat exchanger being arranged in a vaporiser bypass of the refrigerant circuit thereby bypassing the vaporiser and arranged in a coupling branch of the charge air cooling circuit, wherein the coupling branch branches off via a branching-off point from a feed of the charge air cooling circuit leading from the low-temperature coolant cooler to the low-temperature charge air cooler.

2. The cooling system according to claim 1, wherein the coupling branch is directed back into the feed of the charge air cooling circuit via a feedback point arranged upstream of the low-temperature charge air cooler and downstream of the branching-off point.

3. The cooling system according to claim 1, wherein the coupling branch includes a cryogenic charge air cooler for cooling the charge air, the coupling branch being directed back via a feedback point into a return of the charge air cooling circuit leading from the low-temperature charge air cooler to the low-temperature coolant cooler.

4. The cooling system according to claim 3, further comprising a connection, which fluidically connects the feed with the coupling branch between the coupling heat exchanger and the cryogenic charge air cooler.

5. The cooling system according to claim 1, further comprising a high temperature cooling circuit, in which a high temperature coolant circulates, the high temperature cooling circuit including a high temperature charge air cooler for cooling the charge air and a high temperature coolant cooler for cooling the high temperature coolant.

6. The cooling system according to claim 1, further comprising a latent heat storage unit for cooling the low-temperature coolant is integrated into the coupling heat exchanger.

7. The cooling system according to claim 1, wherein the vaporiser is arranged in a gas path, so that a gas flow leads through the vaporiser, and
    a latent heat storage unit, for cooling the gas flow flowing through the vaporiser, is integrated into the vaporiser.

8. The cooling system according to claim 1, wherein the refrigerant circuit is an air-conditioning circuit for cooling an air flow to be directed to a passenger compartment of the vehicle, wherein an air path directing the air flow is directed through the vaporiser.

9. The cooling system according to claim 1, wherein
    the low-temperature coolant cooler is arranged in a cooling air path and a cooling air flow is directed through the low-temperature coolant cooler, and
    the condenser is arranged upstream of the low-temperature coolant cooler in the cooling air path.

10. The cooling system according to claim 1, wherein
    the low-temperature coolant cooler is arranged in a cooling air path and a cooling air flow is directed through the low-temperature coolant cooler, and
    the condenser for the fluidically separated, heat-transmitting coupling of the refrigerant circuit with the charge air cooling circuit is integrated into the charge air cooling circuit upstream of the low-temperature coolant cooler.

11. A method for operating a cooling system, comprising:
    circulating a low-temperature coolant via a charge air cooling circuit,
    cooling charge air via a low-temperature charge air cooler and cooling a low-temperature coolant via a low-temperature coolant cooler,
    circulating a refrigerant via a refrigerant circuit, and providing a vaporiser for vaporising the refrigerant and a condenser for condensing the refrigerant,
    providing a coupling heat exchanger for a fluidically separated, heat transmitting coupling of the charge air cooling circuit with the refrigerant circuit,
    switching the charge air cooling circuit at least between a first cooling efficiency stage and a second cooling efficiency stage in response to a cooling requirement of the charge air,
    bypassing the coupling heat exchanger of low-temperature coolant flow in the first cooling efficiency stage,
    at least one of cooling and keeping cold the coupling heat exchanger via the refrigerant circuit in the first cooling efficiency stage, and
    flowing the low-temperature coolant through the low-temperature coolant cooler and the coupling heat exchanger in the second cooling efficiency stage.

12. The method according to claim 11, further comprising flowing the low-temperature coolant through the low-temperature charge air cooler in the first cooling efficiency stage.

13. The method according to claim 11, further comprising, in the second cooling efficiency stage, flowing a first partial flow of the low-temperature coolant through the low-temperature charge air cooler and bypassing the coupling heat exchanger (19), and flowing a second partial flow of the low-temperature coolant through the coupling heat exchanger and thereafter through a cryogenic charge air cooler.

14. The method according to claim 11, wherein in the first cooling efficiency stage a total flow of the low-temperature coolant bypasses the coupling heat exchanger and flows in a parallel manner in two partial flows through the low-temperature charge air cooler and a cryogenic charge air cooler.

15. The method according to claim 1, further comprising providing at least one latent heat storage unit for changing from the first cooling efficiency stage into the second cooling efficiency stage.

16. The cooling system according to claim 2, wherein the vaporiser is arranged in a gas path such that a gas flow leads through the vaproiser, and a latent heat storage unit for cooling the gas flow flowing through the vaporiser is integrated into the vaporiser.

17. The cooling system according to claim 3, further comprising a high temperature cooling circuit for circulating a high temperature coolant, the high temperature cooling circuit including a high temperature charge air cooler for cooling the charge air and a high temperature coolant cooler for cooling the high temperature coolant.

18. The cooling system according to claim 4, further comprising a latent heat storage unit for cooling the low-temperature coolant integrated into the coupling heat exchanger.

19. A cooling system for a supercharged internal combustion engine, comprising:

a charge air cooling circuit for circulating a low-temperature coolant, the charge air cooling circuit including a low-temperature charge air cooler for cooling charge air and a low-temperature coolant cooler for cooling the low-temperature coolant;

a refrigerant circuit for circulating a refrigerant, the refrigerant circuit having a vaporiser for vaporising the refrigerant and a condenser for condensing the refrigerant;

a coupling heat exchanger for a fluidically separated, heat-transmitting coupling of the charge air cooling circuit with the refrigerant circuit, the coupling heat exchanger being arranged in (i) a vaporising bypass of the refrigerant circuit thereby bypassing the vaporiser and (ii) a coupling branch of the charge air cooling circuit, the coupling branch branching off via a branching-off point from a feed of the charge air cooling circuit leading from the low-temperature coolant cooler to the low-temperature charge air cooler;

wherein the coupling branch includes a cryogenic charge air cooler for cooling the charge air, the coupling branch being directed back via a feedback point into a return of the charge air cooling circuit leading from the low-temperature charge air cooler to the low-temperature coolant cooler, wherein the feed is fluidically connected to the coupling branch via a connection between the coupling heat exchanger and the cryogenic charge air cooler; and a latent heat storage unit for cooling the low-temperature coolant integrated into the coupling heat exchanger.

20. The cooling system according to claim 19, further comprising a high temperature cooling circuit in which a high temperature coolant circulates, the high temperature cooling circuit including a high temperature charge air cooler for cooling the charge air and a high temperature coolant cooler for cooling the high temperature coolant.

\* \* \* \* \*